Oct. 21, 1969  K. W. BENTLEY  3,474,101
THEBAINE AND ORIPAVINE DERIVATIVES
Filed Aug. 10, 1965  4 Sheets-Sheet 1

FIG. 1

INVENTOR
KENNETH WALTER BENTLEY
BY Jacobi & Jacobi
ATTORNEYS

FIG. 2

Oct. 21, 1969    K. W. BENTLEY    3,474,101
THEBAINE AND ORIPAVINE DERIVATIVES
Filed Aug. 10, 1965    4 Sheets-Sheet 3

FIG. 3

INVENTOR.
KENNETH WALTER BENTLEY
BY Jacobs & Jacobs
ATTORNEYS

FIG. 4

United States Patent Office 3,474,101
Patented Oct. 21, 1969

3,474,101
THEBAINE AND ORIPAVINE DERIVATIVES
Kenneth Walter Bentley, Willerby, Hull, England, assignor to Reckitt & Sons Limited, Hull, Yorkshire, England
Continuation-in-part of applications Ser. No. 135,467, Sept. 1, 1961, Ser. No. 196,608, May 22, 1962, and Ser. No. 353,283, Mar. 19, 1964. This application Aug. 10, 1965, Ser. No. 478,738
Claims priority, application Great Britain, Sept. 5, 1960, 30,566/60; June 2, 1961, 20,029/61; Mar. 2, 1962, 8,219/62; Nov. 12, 1962, 42,668/62; June 3, 1965, 23,033/65; June 15, 1965, 25,289/65
Int. Cl. C07d 43/28; A61k 27/00
U.S. Cl. 260—285          12 Claims

ABSTRACT OF THE DISCLOSURE

Thebaine and oripavine derivatives of the formula:

wherein:
R is hydrogen or methyl;
R² is hydrogen, alkyl of up to 3 carbon atoms, phenyl or tolyl or when R is methyl, alkenyl of up to 3 carbon atoms;
R³ is cycloalkyl of 5 to 7 carbon atoms, alkyl or alkenyl of up to 8 carbon atoms, alkyl of up to 8 carbon atoms mono-substituted on one of the carbon atoms numbered 1 to 4 (the carbon atom numbered 1 being adjacent to the carbon atom bearing the alcoholic hydroxy group) by cycloalkyl of 5 to 7 carbon atoms, phenyl, tolyl, methoxyphenyl, ethoxy, phenoxy or tetrahydrofuryl or alkenyl of up to 8 carbon atoms mono-substituted on one of the carbon atoms numbered 1 to 4 by phenyl, provided that where R is hydrogen, and R³ does not contain the systems attached directly to the carbon atom bearing the alcoholic hydroxy group and pharmaceutically acceptable non-toxic salts are useful as analgesics.

This invention relates to novel thebaine and oripavine derivatives and their non-toxic pharmaceutically-acceptable salts. The present application is a continuation-in-part of my applications Ser. No. 135,467, filed Sept. 1, 1961, No. 196,608, filed May 22, 1962, and No. 353,283 filed Mar. 19, 1964, now abandoned.

The thebaine and oripavine derivatives according to the invention are each a compound selected from the group consisting of a compound of the formula which compounds have a steric configuration according to compound I:

and its non-toxic pharmaceutically-acceptable salts, in which formula
R represents hydrogen or methyl,
R² represents hydrogen, alkyl of up to 3 carbon atoms, phenyl, tolyl, or when R is methyl, alkenyl of up to 3 carbon atoms,
R³ represents cycloalkyl of 5–7 carbon atoms, alkyl or alkenyl of up to 8 carbon atoms, alkyl of up to 8 carbon atoms mono-substituted on one of the carbon atoms numbered 1–4 (the carbon atom numbered 1 being adjacent to the carbon atom bearing the alcoholic hydroxy group) by cycloalkyl of 5–7 carbon atoms, phenyl, tolyl, methoxyphenyl, ethoxy, phenoxy, or tetrahydrofuryl, or alkenyl of up to 8 carbon atoms mono-substituted on one of the carbon atoms numbered 1 to 4 by phenyl, provided that where R represents hydrogen, and R³ does not contain the systems attached directly to the carbon atom bearing the alcoholic hydroxy group.

The thebaine derivatives of the present invention are compounds of the general formula:

which compounds have a steric configuration according to compound IIA:

(IIA)

in which formula

$R^2$ is hydrogen, alkyl or alkenyl of up to 3 carbon atoms, or phenyl;

$R^3$ is cycloalkyl of from 5–7 carbon atoms, alkyl or alkenyl of up to 8 carbon atoms or alkyl of up to 8 carbon atoms mono-substituted on one of the carbon atoms numbered 1–4 (the carbon atom numbered 1 being adjacent to the carbon atom bearing the alcoholic hydroxy group) by cycloalkyl of 5–7 carbon atoms, phenyl, methoxyphenyl, ethoxy, phenoxy or tetrahydrofuryl, or alkenyl of up to 8 carbon atoms mono-substituted on carbon atoms 1 to 4 by phenyl.

The oripavine derivatives of the present invention are compounds of the general formula:

which compounds have a steric configuration according to compound IIB:

(IIB)

in which formula $R^2$ is hydrogen, alkyl of 1 to 3 carbon atoms, phenyl or tolyl;

$R^3$ is cycloalkyl of from 5–7 carbon atoms, alkyl or alkenyl of up to 8 carbon atoms, or alkyl of up to 8 carbon atoms mono-substituted on one of the carbon atoms numbered 1–4 (the carbon atom numbered 1 being adjacent to the carbon atom bearing the alcoholic hydroxy group) by cycloalkyl of 5 to 7 carbon atoms, phenyl, or tolyl, or alkenyl of up to 8 carbon atoms mono-substituted on carbon atoms numbered 1 to 4 by phenyl, provided that $R^2$ and $R^3$ does not contain the system $-\overset{|}{\text{C}}\text{H-phenyl}, -\overset{|}{\text{C}}\text{H-tolyl or} -\overset{|}{\text{C}}\text{H}-\overset{|}{\text{C}}=\overset{|}{\text{C}}-$ attached directly to the carbon atom bearing the alcoholic hydroxy group.

The compounds of the invention are therapeutically useful both in base and salt form because of their power to affect the central nervous system, particularly through their analgesic, sedative and anti-tussive effects.

The thebaine derivatives of the general Formula IIA are prepared from an aldehyde or ketone:

(III)

in which $R^2$ has the meaning given above by treatment with a Grignard reagent $R^3MX$ where MX is halo metallic radical and $R^3$ has the meaning given above or by treating the ketone, (IV)

in which $R^3$ has the meaning given above with a Grignard reagent $R^2MX$ in which $R^2$ and MX have the meanings given above or in the case of the secondary alcohols by reduction of such a ketone with sodium borohydride, lithium aluminum hydride, aluminum isopropoxide or sodium amalgam, or, in the special case where $R^2$ is the same as $R^3$ wherein an ester of general formula (V)

in which $R^4$ represents alkyl of 1 to 12 carbon atoms or aryl is treated with a Grignard reagent $R^2MX$ in which $R^2$ and $MX$ have the meanings given above. Other organometallic compounds than Grignard reagents may equally be used in the above processes, e.g. lithium alkyls. The esters of general Formula V may be prepared by Diels Alder condensation between thebaine and the appropriate dienophile $R^4OCOCH=CH_2$. In a preferred process, the ethyl ester ($R^4=Et$) is prepared directly by Diels-Alder condensation between thebaine and ethyl acrylate, and this ester is converted, via the free acid, into the acid chloride from which other esters are prepared by reaction with alcohols of the formula $R^4OH$. $R^4$ is as above defined.

necessary to produce analgesia in 50% of cases (tested with rats). In addition, the lethal dose $LD_{50}$ of the compounds of the invention is generally greater than those of the prior art compounds mentioned above. As a consequence of this, the therapeutic index (i.e. the ratio of $LD_{50}$ to $ED_{50}$) and hence the safety of the compounds of the invention is substantially improved. Data concerning the $ED_{50}$ and $LD_{50}$ for various compounds of the invention are set out below. Table 1 compares the analgesic potencies, molar potencies, toxicities and therapeutic indices of various compounds of the invention with the compounds of the prior art.

TABLE 1

| Compound | Analgesic $ED_{50}$ (mg./kg.) S.C. rats Hydrochloride | Molar Potency Morphine=1 | Toxicity $LD_{50}$ (mg./kg.) I.V. mice | Therapeutic Index $LD_{50}/ED_{50}$ |
|---|---|---|---|---|
| Nepenthol (XII) | >50 | <$1/_{25}$ | 57 | 1 or less |
| Compoind (XIII) | 6.3 | $1/_3$ | 58 | 9.2 |
| Morphine | 2.25 | 1 | 210 | 93.5 |
| Methyldihydromorphinone | 0.18 | 13 | 25 | 139 |
| 6,14-endoetheno-7-(2-hydroxy-2-pentyl)-tetrahydrothebaine | 0.034 | 96.5 | 62 | 1,825 |
| 6,14-endoetheno-7-(2-hydroxy-2-hepyt-)-tetrahydrothebaine | 0.14 | 24.5 | 100 | 625 |
| 6,14-endoetheno-7-(2-hydroxy-1-phenyl-2-propyl)-tetrahydrothebaine | 0.025 | 153 | 30 | 1,200 |
| 6,14-endoetheno-7-(3-hydroxy-1-phenyl-3-butyl)-tetrahydrothebaine | 0.007 | 555 | 42 | 6,000 |
| 6,14-endoetheno-7-(4-hydroxy-1-tetrahydrofuryl-4-pentyl)-tetrahydrothebaine | 0.040 | 92.1 | 63 | 1,575 |

It will be understood by those versed in the art, that during the production of those compounds in which $R^2$ and $R^3$ are different a new asymmetric centre is generated and that two diastereoisomers will generally result in unequal amounts since other centres of asymmetry are present.

The oripavine derivatives of the general Formula IIB, are prepared by demethylating the compounds II above with an alkali metal hydroxide in a suitable solvent, such as diethylene glycol, at temperatures slightly above 200° C. Clearly those analogues containing the systems do not survive such vigorous reaction conditions as they suffer base-catalyzed dehydration in the process.

With regard to analgesic potency, many of the compounds of the present invention are greatly superior to known analgesics, such as morphine and methyl dihydromorphinone, and even more superior to the previously disclosed compounds nepenthol (XIII) which does not exhibit analgesic properties and 7-hydroxymethylene-6,14-endoethenotetrahydrothebaine (XIV)

This superiority is shown in the effective doses $ED_{50}$, that is the dose (expressed in mg. per kg. of body weight)

Thebaine and oripavine derivatives in accordance with the present invention are illustrated by the following non-limitative examples, wherein the parts are by weight.

EXAMPLE 1

6,14-endoetheno-7-(1-hydroxy-1-ethyl)tetrahydrothebaine (a) 10 parts of 6,14-endoetheno-7-acetyltetrahydrothebaine were boiled with 20 parts of aluminum isopropoxide in 60 parts of isopropanol with slow distillation of the solvent through a fractionating column until the distillate no longer gave a precipitate with 2,4-dinitrophenylhydrazine in dilute hydrochloric acid. The mixture was then further rapidly evaporated to small bulk and poured in a thin stream into a vigorously stirred ice-cold solution of Rochelle salt containing crushed ice. The precipitated base was collected and washed well with water. When dry it had M.P. of 80° C., raised to 82° C. by recrystallization from aqueous methanol.

(b) 10 parts of 6,14-endoetheno-7-acetyltetrahydrothebaine were heated on the steam bath with 1 part of sodium borohydride in 50 parts of methanol for thirty minutes. The solution was concentrated, poured into water and the mixture extracted with ether. Evaporation of the dry ether extract afforded a colorless very viscous gum from which a small amount of the compound M.P. 82° C. described in (a) was obtained by crystallization from ether at −70° C. The rest of the material remained uncrystallizable and was identified as a diastereo isomer by conversion into the O-acetyl derivative with acetic anhydride and pyridine, this derivative being obtained as white plates M.P. 170° C.

EXAMPLE 2

6,14-endoetheno-7-(1-hydroxy-1-propyl)-tetrahydrothebaine 10 parts of 6,14-endoetheno-7-formyltetrahydrothebaine in 150 parts of ether were added to a boiling stirred solution of ethylmagnesium bromide prepared from 1.70 parts of magnesium and 7.8 parts of ethyl bromide in 50 parts of ether. The mixture was then stirred and heated under reflux for one hour. The mixture was shaken with saturated ammonium chloride solution and the ether layer was separated, dried and evaporated leaving a highly viscous gum. This gum when treated with ethanolic hydrogen bromide afforded a crystalline hydrobromide, melting point 90° C. The base also gave a crystalline O-acetyl derivative M.P. 84 C. The second isomer was obtained as an uncharacterizable gum from the mother liquors of preparation of the hydrobromide.

EXAMPLE 3

6,14-endoetheno-7-(1-hydroxy-1-butyl)-tetrahydrothebaine

This was prepared as described in Example 2 from 10 parts of 6,14-endoetheno-7-formyltetrahydrothebaine, 1.70 parts of magnesium and 5.60 parts of 1-chloropropane. The α-isomer was a gum giving a bitartrate trihydrate M.P. 95° C. and an O-acetyl derivative M.P. 70° C. The β-isomer was non-crystalline.

EXAMPLE 4

6,14-endoetheno-7-(1-hydroxy-1-nonyl)-tetrahydrothebaine

This was prepared as in Example 2 from 10 parts of 6,14-endoetheno-7-formyltetrahydrothebaine, 1.70 parts of magnesium and 13.7 parts of 1-bromo-n-octane. The α-isomer had M.P. 78° C.; the β-isomer was a gum.

EXAMPLE 5

6,14-endoetheno-7-(cyclohexylhydroxymethyl)-tetrahydrothebaine

This base was prepared as in Example 2 from 10 parts of 6,14-endoetheno-7-formyltetrahydrothebaine, 1.70 parts of magnesium and 8.4 parts of 1-chlorocyclohexane. The α-isomer had M.P. 98° C. and gave an O-acetyl derivative M.P. 176° C. to 178° C. The β-isomer did not crystallize.

EXAMPLE 6

6,14-endoetheno-7-(1-hydroxy-2-phenyl-1-ethyl)-tetrahydrothebaine 6,14 - endoetheno - 7 - (1 - hydroxy-2-phenyl-1-ethyl)-tetrahydrothebaine was prepared as in Example 2 from 10 parts of 6,14-endoetheno - 7 - formyltetrahydrothebaine, 1.67 parts of magnesium and 12.1 parts of benzyl bromide. The α-isomer had M.P. 95° C. and gave a bitartrate dihydrate M.P. 125° C.; the β-isomer did not crystallize.

EXAMPLE 7

6,14-endoetheno-7-(1-hydroxy-3-phenyl-1-propyl)-tetrahydrothebaine

This was prepared as in Example 2 from 10 parts of 6,14-endoetheno-7-formyltetrahydrothebaine, 1.70 parts of magnesium and 13.8 parts of phenylethyl bromide. The α-isomer had M.P. 80° C. and gave a bitartrate dihydrate M.P. 140° C.; the β-isomer did not crystallize.

EXAMPLE 8

6,14-endoetheno-7-(1-hydroxy-4-ethoxy-1-butyl)-tetrahydrothebaine

This was prepared as described in Example 2 from 10 parts of 6,14-endoetheno-7-formyltetrahydrothebaine, 1.7 parts of magnesium and 8.7 parts of 1-chloro-3-ethoxypropane. The α- and β-isomers were oils but the α-isomer gave a bitartrate trihydrate M.P. 100° C.

EXAMPLE 9

6,14-endoetheno-7-(1-hydroxy-4-tetrahydrofuryl-1-butyl)-tetrahydrothebaine

This was prepared as described in Example 2 from 10 parts of 6,14 - endoetheno-7-formyltetrahydrothebaine, 1.70 parts of magnesium and 13.7 parts of 1-bromo-3-tetrahydrofurylpropane. The α-isomer had M.P. 114° C. and the β-isomer was non-crystalline.

EXAMPLE 10

6,14-endoetheno-7-(2-hydroxy-2-propyl)-tetrahydrothebaine 10 parts of 6,14-endoetheno-7-acetyltetrahydrothebaine was extracted from a Soxhlet extractor into a boiling stirred solution of methylmagnesium iodide, prepared from 1.67 parts of magnesium and 9.9 parts of methyl iodide in 40 parts of ether and the mixture was stirred and heated under reflux for a further one hour. The mixture was then shaken with saturated ammonium chloride solution and the ether layer was separated, dried and evaporated, leaving the crystalline base M.P. 159° C. raised to 161° C. on recrystallization from aqueous methanol.

EXAMPLE 11

6,14-endoetheno-7-(2-hydroxy-2-butyl)-tetrahydrothebaine

This was prepared by the method described in Example 10 from 10 parts of 6,14-endoetheno-7-acetyltetrahydrothebaine, 1.67 parts of magnesium and 10.9 parts of iodoethane. Evaporation of the ether afforded a viscous gum that crystallized in part on trituration with methanol. The α-isomer so obtained had M.P. 132° C. and gave a hydrochloride M.P. 245° C. The β-isomer, recovered from the methanol solution, failed to crystallize.

EXAMPLE 12

6,14-endoetheno-7-(2-hydroxy-2-pentyl)-tetrahydrothebaine

This was prepared by the method described in Example 10 from 10 parts of 6,14-endoetheno-7-acetyltetrahydrothebaine, 1.67 parts of magnesium and 11.7 parts of 1-iodopropane. The residue from the evaporation of the ether afforded the α-isomer on trituration with methanol; this had M.P. 176° C. and gave a hydrochloride M.P. 217° C. The β-isomer crystallized when the methanolic mother liquors were diluted with twice their volume of water and the liquid decanted after five minutes from a quantity of gummy material. It has M.P. 81° C. and gave a hydrochloride M.P. 240° C.

EXAMPLE 13

6,14-endoetheno-7-(2-hydroxy-3-methyl-2-butyl)-tetrahydrothebaine

This was prepared as described in Example 10 from 10 parts of 6,14-endoetheno-7-acetyltetrahydrothebaine, 1.67 parts of magnesium and 11.7 parts of 1-iodopropane. Trituration with methanol of the residue from evaporation of the ether afforded the α-isomer as crystals M.P. 92° C., giving a hydrochloride M.P. 248° C. The

EXAMPLE 14

6,14-endoetheno-7-(2-hydroxy-2-hexyl)-
tetrahydrothebaine

This was prepared as described in Example 10 from 10 parts of 6,14-endoetheno-7-acetyltetrahydrothebaine, 1.67 parts of magnesium and 9.5 parts of 1-bromobutane. The α-isomer had M.P. 150° C. and the β-isomer (from the mother liquors) M.P. 89° C.

EXAMPLE 15

6,14-endoetheno-7-(2-hydroxy-4-methyl-2-pentyl)-
tetrahydrothebaine

This was prepared as in Example 10 from 10 parts of 6,14-endoetheno-7-acetyltetrahydrothebaine, 1.67 parts of magnesium and 9.5 parts of 1-bromo-2-methylpropane (isobutyl bromide). The α-isomer had M.P. 152° C. and the β-isomer 82° C.; the hydrochlorides had M.P.'s 188° C. and 250° C. respectively.

EXAMPLE 16

6,14-endoetheno-7-(2-hydroxy-3,3-dimethyl-2-butyl)-
tetrahydrothebaine

This was obtained as described in Example 10 from 10 parts of 6,14-endoetheno-7-acetyltetrahydrothebaine, 1.67 parts of magnesium and 12.7 parts of 2-iodo-2-methylpropane (tert. butyl iodide). The α-isomer had M.P. 110° C.; the β-isomer failed to crystallize.

EXAMPLE 17

6,14-endoetheno-7-(2-hydroxy-2-heptyl)-
tetrahydrothebaine 10 parts of 6,14-endoetheno-7-acetyltetrahydrothebaine was extracted from a Soxhlet extractor into a boiling stirred solution of n-amylmagnesium iodide, prepared from 1.67 parts of magnesium and 10.7 parts of n-amylbromide. The mixture was stirred and heated under reflux for a further period of one hour, after which it was cooled and shaken with dilute acetic acid until the aqueous layer remained permanently acid, in order to separate basic material from any excess of amyl bromide. The acid layer was made alkaline with ammonia and the base extracted with ether. The ether layer was separated, dried and evaporated, leaving a viscous gum that on trituration with methanol afforded the α-isomer M.P. 103° C., hydrochloride M.P. 250° C. The β-isomer, obtained from the methanol solution, failed to crystallize.

EXAMPLE 18

6,14-endoetheno-7-(2-hydroxy-5-methyl-2-hexyl)-
tetrahydrothebaine

This was obtained by the method of Example 17 from 10 parts of 6,14-endoetheno-7-acetyltetrahydrothebaine, 1.67 parts of magnesium and 10.7 parts of 1-bromo-3-methylbutane (isoamyl bromide). The α-isomer had M.P. 126° C., its hydrochloride M.P. 258° C., the β-isomer M.P. 80° C. and its hydrochloride 190° C.

EXAMPLE 19

6,14-endoetheno-7-(2-hydroxy-3,3-dimethyl-2-pentyl)-
tetrahydrothebaine

This was obtained by the method described in Example 17 from 10 parts of 6,14-endoetheno-7-acetyltetrahydrothebaine, 1.67 parts of magnesium and 13.5 parts of 2-iodo-2-methylbutane. The isomers were non-crystalline and separation was not effected.

EXAMPLE 20

6,14-endoetheno-7-(2-hydroxy-2-octyl)-
tetrahydrothebaine

This was prepared as described in Example 17 from 10 parts of 6,14-endoetheno-7-acetyltetrahydrothebaine, 1.67 parts of magnesium and 11.5 parts of 1-bromohexane. The α-isomer had M.P. 65° C. and gave a hydrochloride M.P. 270° C.; the β-isomer was not crystalline.

EXAMPLE 21

6,14-endoetheno-7-(2-hydroxy-2-nonyl)-
tetrahydrothebaine

This was prepared as in Example 17 from 10 parts of 6,14-endoetheno-7-acetyltetrahydrothebaine, 1.67 parts of magnesium and 12.2 parts of 1-bromoheptane. Both α- and β-isomers were non-crystalline but the α-isomer afforded a crystalline hydrochloride M.P. 245° C.

EXAMPLE 22

6,14-endoetheno-7-(2-hydroxy-2-decyl)-
tetrahydrothebaine

This was prepared as described in Example 17 from 10 parts of 6,14-endoetheno-7-acetyltetrahydrothebaine, 1.67 parts of magnesium and 13.5 parts of 1-bromoctane. The α-isomer had M.P. 79° C. and gave a hydrochloride M.P. 262° C.; the β-isomer did not crystallize.

EXAMPLE 23

6,14-endoetheno-7-(1-hydroxy-1-cyclopentyl-1-ethyl)-
tetrahydrothebaine

This was prepared as described in Example 17 from 10 parts of 6,14-endoetheno-7-acetyltetrahydrothebaine, 1.67 parts of magnesium and 10.5 parts of 1-bromocyclopentane. The α-isomer had M.P. 86° C. and gave a hydrochloride M.P. 240° C. The β-isomer did not crystallize.

EXAMPLE 24

6,14-endoetheno-7-(1-hydroxy-1-cyclohexyl-1-ethyl)-
tetrahydrothebaine

This was prepared as described in Example 17 from 10 parts of 6,14-endoetheno-7-acetyltetrahydrothebaine, 1.67 parts of magnesium and 9.7 parts of 1-chlorocyclohexane. The α-isomer had M.P. 201° C., hydrochloride 208° C. and the β-isomer M.P. 172° C., hydrochloride 183° C.

EXAMPLE 25

6,14-endoetheno-7-(2-hydroxy-1-phenyl-2-propyl)-
tetrahydrothebaine

This base was obtained as described in Example 17 from 10 parts of 6,14-endoetheno-7-acetyltetrahydrothebaine, 1.68 parts of magnesium and 12 parts of benzyl bromide. The α-isomer had M.P. 187° C.; the β-isomer failed to crystallize.

EXAMPLE 26

6,14-endoetheno-7-(2-hydroxy-1-p-methoxyphenyl-2-
propyl)-tetrahydrothebaine

This was prepared as described in Example 17 from 10 parts of 6,14-endoetheno-7-acetyltetrahydrothebaine, 1.67 parts of magnesium and 12 parts of p-methoxybenzyl chloride. The α-isomer had M.P. 117° C., hydrochloride M.P. 240° C.; the β-isomer had M.P. 99° C.; hydrochloride was not crystalline.

EXAMPLE 27

6,14-endoetheno-7-(3-hydroxy-1-phenyl-3-butyl)-
tetrahydrothebaine

This was prepared as described in Example 17 from 10 parts of 6,14-endoetheno-7-acetyltetrahydrothebaine, 1.67 parts of magnesium and 12.8 parts of 2-phenylethyl bromide. The α-isomer had M.P. 145° C., hydrochloride β-isomer recovered from the methanolic liquor was not crystalline.

M.P. 236° C.; the β-isomer had M.P. 92° C., hydrochloride M.P. 180° C.

EXAMPLE 28

6,14-endoetheno-7-(4-hydroxy-1-phenyl-4-pentyl)-tetrahydrothebaine

This was prepared as described in Example 17 from 10 parts of 6,14-endoetheno-7-acetyltetrahydrothebaine, 1.67 parts of magnesium and 13.7 parts of 1-bromo-3-phenylpropane. The α-isomer had M.P. 117° C., hydrochloride 248° C.; the β-isomer had M.P. 94° C., hydrochloride 235° C.

EXAMPLE 29

6,14-endoetheno-7-(4-hydroxy-4-pent-1-enyl)-tetrahydrothebaine

This was prepared as described in Example 17 from 10 parts of 6,14-endoetheno-7-acetylhydrothebaine, 1.67 parts of magnesium and 8.5 parts of allyl bromide. The α-isomer had M.P. 160° C., hydrochloride M.P. 260° C. and the β-isomer M.P. 126° C.; hydrochloride was not crystalline.

EXAMPLE 30

6,14-endoetheno-7-(3-hydroxy-1-phenyl-3-but-1-enyl)-tetrahydrothebaine

This base was prepared as described in Example 17 from 10 parts of 6,14-endoetheno-7-acetyltetrahydrothebaine, 1.67 parts of magnesium and 12.7 parts of β-styryl bromide. The α-isomer had M.P. 92° C., hydrochloride 248° C.; the minor β-isomer failed to crystallize.

EXAMPLE 31

6,14-endoetheno-7-(1-ethoxy-4-hydroxy-4-pentyl)-tetrahydrothebaine

This was prepared as described in Example 17 from 10 parts of 6,14-endoetheno-7-acetyltetrahydrothebaine, 1.67 parts of magnesium and 8.5 parts of 1-chloro-3-ethoxypropane. The α-isomer had M.P. 107° C., hydrochloride 248° C. The minor β-isomer failed to crystallize.

EXAMPLE 32

6,14-endoetheno-7-(5-hydroxy-1-phenoxy-5-hexyl)-tetrahydrothebaine

This was prepared as described in Example 17 from 10 parts of 6,14-endoetheno-7-acetyltetrahydrothebaine, 1.67 parts of magnesium and 16.0 parts of 1-bromo-4-phenoxybutane. The α-isomer had M.P. 221° C., hydrochloride M.P. 260° C.; the β-isomer had M.P. 116° C., hydrochloride M.P. 240° C.

EXAMPLE 33

6,14-endoetheno-7-(2-hydroxy-1-tetrahydrofuryl-2-propyl)-tetrahydrothebaine

This was prepared as described in Example 17 from 10 parts of 6,14-endoetheno-7-acetyltetrahydrothebaine, 1.67 parts of magnesium and 11.5 parts of tetrahydrofurfuryl bromide. The α-isomer was crystallized with great difficulty; it had M.P. 140° C.; the β-isomer failed to crystallize.

EXAMPLE 34

6,14-endoetheno-7-(4-hydroxy-1-tetrahydrofuryl-4-pentyl)-tetrahydrothebaine

This was prepared as described in Example 17 from 10 parts of 6,14-endoetheno-7-acetyltetrahydrothebaine, 1.67 parts of magnesium and 13.4 parts of 1-bromo-3-tetrahydrofuryl propane. The α-isomer had M.P. 128° C., hydrochloride M.P. 185° C.; the β-isomer failed to crystallize.

EXAMPLE 35

6,14-endoetheno-7-(1-hydroxy-1-phenyl-1-ethyl)-tetrahydrothebaine (a) This was prepared by the method of Example 17 from 10 parts of 6,14-endoetheno-7-acetyltetrahydrothebaine, 1.67 parts of magnesium and 11.0 parts of bromobenzene. The α-isomer had M.P. 254° C., hydrochloride M.P. 194° C.; the minor β-isomer had M.P. 208° C., hydrochloride M.P. 230° C.

(b) The bases were also prepared according to Example 10 from 10 parts of 6,14-endoetheno-7-benzoyltetrahydrothebaine, 1.44 parts of magnesium and 9.9 parts of methyl iodide. In this reaction the major product was the β-isomer, the α-isomer being the minor product.

EXAMPLE 36

6,14-endoetheno-7-(1-hydroxy-1-phenyl-1-butyl)-tetrahydrothebaine

This was prepared as described in Example 17 from 10 parts of 6,14-endoetheno-7-benzoyltetrahydrothebaine, 1.44 parts of magnesium and 10.2 parts of 1-iodopropane. The product had M.P. 177° C., hydrochloride M.P. 210° C. The second isomer was not detected.

EXAMPLE 37

6,14-endoetheno-7-(cyclohexylphenylhydroxymethyl)-tetrahydrothebaine

This was prepared as described in Example 17 from 10 parts of 6,14-endoetheno-7-benzoyltetrahydrothebaine, 1.44 parts of magnesium and 7.15 parts of chlorocyclohexane. The base had M.P. 232° C. and the hydrochloride M.P. 239° C.

EXAMPLE 38

6,14-endoetheno-7-(1-hydroxy-1,2-diphenyl-1-ethyl)-tetrahydrothebaine

This was prepared as described in Example 17 from 10 parts of 6,14-endoetheno-7-benzoyltetrahydrothebaine, 1.44 parts of magnesium and 10.3 parts of benzyl bromide. The base had M.P. 210° C. and the hydrochloride M.P. 220° C.

EXAMPLE 39

6,14-endoetheno-7-(1-phenyl-1-hydroxy-1-but-3-enyl)-tetrahydrothebaine

This was prepared as described in Example 17 from 10 parts of 6,14-endoetheno-7-benzoyltetrahydrothebaine, 1.44 parts of magnesium and 7.3 parts of allyl bromide. The base had M.P. 198° C., hydrochloride M.P. 210° C.

Oripavine derivatives in accordance with the present invention are illustrated by the following non-limitative examples.

EXAMPLE 40

6,14-endoetheno-7-α-(1-hydroxy-1-ethyl)-tetrahydrooripavine 6,14 - endoetheno - 7-α-(1-hydroxy-1-ethyl)-tetrahydrothebaine (8 parts) was added to a solution of potassium hydroxide (60 parts) in diethylene glycol (150 parts) boiling under reflux at a temperature of from 200° C. to 210° C. The mixture was boiled under reflux with vigorous stirring until a test portion diluted with ten times its volume of water gave a homogeneous solution. The whole mixture was then diluted with five times its volume of water and saturated ammonium chloride was added until precipitation ceased. The precipitated solid was collected, washed well with water and recrystallized from 2-ethoxyethanol, when the base was obtained as white prisms M.P. 298° C. Found: C, 71.2; H, 7.5; $C_{22}H_{27}O_4N$ requires C, 71.4; H, 7.3%. The hydrochloride formed white prisms M.P. 272° C. and was obtained from the base and ethanolic hydrogen chloride by the addition of diethyl ether. Found: C, 63.6; H, 7.0; $C_{22}H_{27}O_4N.HCl.\frac{1}{2}H_2O$ requires C, 63.9; H, 6.8%.

The acetyl ester, prepared by refluxing a mixture of the base and acetic anhydride had M.P. 147° C.

EXAMPLE 41

6,14-endoetheno-7-(2-hydroxy-2-propyl)-tetrahydro-oripavine

This was prepared essentially as in Example 40 from 6,14 - endoetheno - 7-(2-hydroxy-2-propyl)tetrahydrothebaine. The precipitated base was extracted with ether, the dried extract evaporated and the solid residue recrystallized from aqueous 2-ethoxyethanol, when the base was obtained as white prisms M.P. 266° C. Found: C, 72.4; H, 7.5; N, 3.2. $C_{23}H_{29}O_4N$ requires C, 72.1; H, 7.6; N, 3.6%. The hydrochloride had M.P. 288° C. to 290° C. with decomposition.

The 3-acetyl ester was precipitated on the addition of acetic anhydride to a solution of the base in aqueous sodium hydroxide. The solid was collected, washed and recrystallized from methanol, when it was obtained as colorless prisms M.P. 191° C. Found: C, 70.6; H, 7.2; $C_{25}H_{31}O_5N$ requires C, 70.5; H, 7.4%. The hydrochloride had M.P. 266° C.

EXAMPLE 42

6,14-endoetheno-7-α-(2-hydroxy-2-butyl)-tetrahydro-oripavine

This was prepared as in Example 40 from 6,14-endoetheno - 7-α-(2-hydroxy-2-butyl)-tetrahydrothebaine and the free base was obtained as white prisms M.P. 268° C. from 2-ethoxyethanol. Found: C, 72.5; H, 8.1; $C_{24}H_{31}O_4N$ requires: C, 72.6; H, 7.8%. The hydrochloride formed white prisms M.P. 282° C. Found: C, 62.5; H, 7.6; $C_{24}H_{31}O_4N.HCl.1½H_2O$ requires: C, 62.6; H, 7.8%.

The 3-acetyl ester, prepared by heating the base under reflux with acetic anhydride, had M.P. 156° C. on recrystallization from methanol.

EXAMPLE 43

6,14-endoetheno-7-α-(2-hydroxy-2-pentyl)-tetrahydro-oripavine

This was prepared as in Example 40 from 6,14-endoetheno - 7-α-(2-hydroxy-2-pentyl)-tetrahydrothebaine, and the free base was obtained as white prisms M.P. 215° C. from aqueous 2-ethoxy-ethanol. Found, C, 70.0; H, 7.9; $C_{25}H_{33}O_4N.H_2O$ requires C, 70.0; H, 8.1%. The hydrochloride formed white prisms M.P. 266° C. to 267° C.

The 3-acetyl ester, prepared by the Schotten-Baumann process, was obtained as colorless prisms M.P. 195° C. from methanol. Found: C, 71.3; H, 7.7; $C_{27}H_{35}O_5N$ requires: C, 71.5; H, 7.7%. The hydrochloride formed white prisms M.P. 206° C.

The 3-propionyl ester, prepared by heating the base under reflux with propionic anhydride, had M.P. 130° C. on recrystallization from aqueous ethanol.

EXAMPLE 44

6,14-endoetheno-7-β-(2-hydroxy-2-pentyl)-tetrahydro-oripavine

This was prepared as in Example 40 from 6,14-endoetheno-7-β-(2-hydroxy-2-pentyl)tetrahydrothebaine, and the free base was obtained as off-white prisms M.P. 280° C. on recrystallization from 2-ethoxyethanol. Found: C, 71.2; H, 7.8; $C_{25}H_3O_4N.½H_2O$ requires: C, 71.4; H, 8.1%. The hydrochloride formed white prisms M.P. 290° C. (decomposition). Found: C, 64.8; H, 7.4; $C_{25}H_{33}O_4N.HCl.H_2O$ requires: C, 64.5; H, 7.7%.

EXAMPLE 45

6,14-endoetheno-7-(3-hydroxy-3-pentyl)-tetrahydro-oripavine

This was prepared as in Example 40 from 6,14-endoetheno-7-(3-hydroxy-3-pentyl)tetrahydrothebaine and the base was obtained as white prisms M.P. 157° C. on recrystallization from aqueous 2-ethoxyethanol. Found: C, 71.5; H, 8.1; $C_{25}H_{33}O_4N.½H_2O$ requires: C, 71.4; H, 8.1%. The hydrochloride formed white prisms M.P. >290° C. Found: C, 66.6; H, 7.6; $C_{25}H_{33}O_4N.HCl$ requires: C, 66.9; H, 7.6%.

The 3-acetyl ester, prepared by refluxing the base with acetic anhydride was obtained as prisms M.P. 179° C.

EXAMPLE 46

6,14-endoetheno-7-α-(2-hydroxy-2-hexyl)-tetrahydro-oripavine

This was prepared as in Example 40 from 6,14-endoetheno-7-α-(2-hydroxy - 2 - hexyl)tetrahydrothebaine; this base was obtained as white prisms M.P. 174° C. from aqueous 2-ethoxyethanol. Found: C, 70.6; H, 8.5; $C_{26}H_{35}O_4N.H_2O$ requires: C, 70.4; H, 7.3%. The hydrochloride formed white prisms M.P. 272° C. Found: C, 62.2; H, 8.0; $C_{26}H_{35}O_4N.HCl$ requires: C, 67.5; H, 7.8%.

EXAMPLE 47

6,14-endoetheno-7-α-(2-hydroxy-4-methyl-2-pentyl)-tetrahydro-oripavine

This was prepared as in Example 40 from 6,14-endoetheno-7-α-(2-hydroxy - 4 - methyl - 2 - pentyl)tetrahydrothebaine; this base was obtained as off-white prisms M.P. 217° C. on recrystallization from aqueous 2-ethoxyethanol. Found: C, 70.7; H, 8.4; $C_{26}H_{35}O_4N.H_2O$ requires: C, 70.4; H, 8.3%. The hydrochloride formed prisms M.P. 292° C.

The 3-acetyl ester, from the base and acetic anhydride, form white prisms M.P. 151° C. from aqueous ethanol.

EXAMPLE 48

6,14-endoetheno-7-α-(2-hydroxy-2-heptyl)-tetrahydro-oripavine

This was prepared from 6,14-endoetheno-7-α-(2-hydroxy-2-heptyl)tetrahydrothebaine as in Example 40; this base was obtained as off-white prisms M.P. 106° C. from aqueous 2-ethoxyethanol. Found: C, 72.6; H, 8.6; $C_{27}H_{37}O_4N.½H_2O$ requires: C, 72.3; H, 8.5%. The hydrochloride formed white prisms M.P. 278° C. Found: C, 66.7; H, 8.0; $C_{27}H_{37}O_4N.HCl.½H_2O$ requires: C, 66.6; H, 8.0%.

EXAMPLE 49

6,14-endoetheno-7-α-(2-hydroxy-5-methyl-2-hexyl)-tetrahydro-oripavine

This was prepared from 6,14-endoetheno-7-α-(2-hydroxy-5-methyl-2-hexyl)tetrahydrothebaine as in Example 40; this base was obtained as white prisms M.P. 131° C. from aqueous 2-ethoxyethanol. Found: C, 73.4; H, 8.1; $C_{27}H_{37}O_4N$ requires: C, 73.6; H, 8.2%. In this preparation boiling for several hours was necessary for complete demethylation and precipitation of the base was accompanied by the precipitation of a considerable amount of silica (from attack of the glassware by the alkali); the base was freed from this material by filtration of a hot 2-ethoxyethanol suspension.

The hydrochloride M.P. 258° C. Found: C, 68.0; H, 8.3; $C_{27}H_{37}O_4N.HCl$ requires: C, 68.1; H, 8.0%.

The 3-acetyl ester, obtained by the Schotten-Baumann process and by heating the base with acetic anhydride, was obtained as white prisms M.P. 126° C. Found: C, 71.9; H, 8.1; $C_{29}H_{39}O_5N$ requires: C, 72.3; H, 8.2%.

EXAMPLE 50

6,14-endoetheno-7-α-(2-hydroxy-2-octyl)-tetrahydro-oripavine

This base was prepared from 6,14-endoetheno-7-α-(2-hydroxy-2-octyl)tetrahydrothebaine as in Example 40, being obtained as white prisms M.P. 288° C. on recrystallization from aqueous 2-ethoxyethanol. Found: C, 74.6; H, 8.6; $C_{28}H_{39}O_4N$ requires: C, 74.1; H, 8.6%.

EXAMPLE 51

6,14-endoetheno-7-α-(2-hydroxy-2-decyl)-tetrahydro-oripavine

This base, prepared as in Example 40 from 6,14-endoetheno-7-α-(2-hydroxy - 2 - decyl)tetrahydrothebaine, was obtained as off-white crystals M.P. 275° C. from aqueous 2-ethoxyethanol. Found: C, 74.5; H, 9.5; $C_{30}H_{43}O_4N$ requires: C, 74.7; H, 9.4%.

EXAMPLE 52

6,14-endoetheno-7-α-(2-hydroxy-3-methyl-2-butyl)-tetrahydro-oripavine

This base was prepared from 6,14-endoetheno-7-α-(2-hydroxy-3-methyl-2-butyl)tetrahydrothebaine as in Example 40, and was obtained as white prisms M.P. 278° C. on recrystallization from aqueous 2-ethoxyethanol. The hydrochloride was obtained as a white powder M.P. 296° C. Found: C, 64.4; H, 7.5; $C_{25}H_{33}O_4N.HCl$ requires: C, 64.5; H, 7.7%.

EXAMPLE 53

6,14-endoetheno-7-α-(1-hydroxy-1-phenyl-1-ethyl)-tetrahydro-oripavine

This base, prepared as in Example 40 from 6,14-endoetheno-7-α-(1-hydroxy-1-phenyl - 1 - ethyl)tetrahydrothebaine, was obtained as white prisms M.P. 252° C. from aqueous 2-ethoxyethanol. Found: C, 72.9; H, 7.6; $C_{28}H_{31}O_4N.H_2O$ requires: C, 72.7; H, 7.2%. The hydrochloride was obtained as white prisms M.P. 286° C.

EXAMPLE 54

6,14-endoetheno-7-α-(1-hydroxybenzyl)-tetrahydro-oripavine

This was prepared from 6,14-endoetheno-7-α-(1-hydroxybenzyl)tetrahydrothebaine as in Example 40 and was obtained as white prisms M.P. 160° C. Found: C, 72.6; H, 6.7; $C_{27}H_{29}O_4N.H_2O$ requires: C, 72.8; H, 6.7%. The hydrochloride had M.P. 300° C.

EXAMPLE 55

6,14-endoetheno-7-α-(1-hydroxy-3-phenyl-1-propyl)-tetrahydro-oripavine

This base, prepared from 6,14-endoetheno-7-α-(1-hydroxy - 3 - phenyl - 1 - propyl)tetrahydrothebaine, was obtained as white prisms M.P. 120° C. on recrystallization from aqueous 2-ethoxyethanol. Found: C, 75.8; H, 7.3; $C_{29}H_{33}O_4N$ requires: C, 75.7; H, 7.2%. The hydrochloride formed white prisms M.P. 290° C. Found: C, 69.9; H, 7.1; $C_{29}H_{33}O_4N.HCl$ requires: C, 70.2; H, 6.9.

EXAMPLE 56

6,14-endoetheno-7-α-(3-hydroxy-1-phenyl-3-butyl)-tetrahydro-oripavine

This base was prepared from 6,14-endoetheno-7-α-(3-hydroxy-1-phenyl-3-butyl)tetrahydrothebaine as in Example 40 and on recrystallization from aqueous 2-ethoxyethanol was obtained as white prisms M.P. 226° C. Found: C, 75.7; H, 7.6; $C_{30}H_{35}O_4N$ requires: C, 76.1; H, 7.5%. The hydrochloride formed white prisms M.P. 255° C. Found: C, 70.6; H, 7.1; $C_{30}H_{35}O_4N.HCl$ requiries: C, 70.5; H, 7.1%.

EXAMPLE 57

6,14-endoetheno-7-α-(1-hydroxy-1-cyclopentyl-1-ethyl)tetrahydro-oripavine

This base was prepared from 6,14-endoetheno-7-α-(1-hydroxy-1-cyclopentyl-1-ethyl)tetrahydrothebaine as in Example 40 and on recrystallization from aqueous 2-ethoxyethanol was obtained as white prisms M.P. 300° C. to 302° C. Found: C, 74.0; H, 7.9; $C_{27}H_{35}O_4N$ requires C, 74.1; H, 8.1%. The hydrochloride formed white prisms M.P. 294° C. to 296° C. Found: C, 64.4; H, 7.9; $C_{27}H_{35}O_4N.HCl.1\frac{1}{2}H_2O$ requires: C, 64.7; H, 7.9%.

EXAMPLE 58

6,14-endoetheno-7-α-(1-hydroxy-1-cyclohexyl-1-ethyl)tetrahydro-oripavine

This base was prepared from 6,14-endoetheno-7-α-(1-hydroxy-1-cyclohexyl-1-ethyl)tetrahydrothebaine by the general method of Example 40 and was obtained as white prisms M.P. 232° C. on recrystallization from methanol. Found C, 69.2; H, 8.4; $C_{28}H_{37}O_4N.2H_2O$ requires: C, 69.0; H, 8.4%. The hydrochloride formed white prisms M.P. 248° C. Found: C, 66.1; H, 7.8; $C_{28}H_{37}O_4.HCl.H_2O$ requires C, 66.4; H, 7.9%.

The 3-acetyl ester, prepared from the base and acetic anhydride was obtained as white prisms M.P. 193° C. Found: C, 70.8; H, 8.2; $C_{30}H_{39}O_5N.H_2O$ requires: C, 70.5; H, 8.1% hydrochloride M.P. 262° C. Found: C, 67.6; H, 7.6; $C_{30}H_{39}O_5N.HCl$ requires: C, 67.9; H, 7.6%.

EXAMPLE 59

6,14-endoetheno-7-β-(1-hydroxy-1-cyclohexyl-1-ethyl)tetrahydro-oripavine

This base prepared from 6,14-endoetheno-7-β-(1-hydroxy-1-cyclohexyl-1 - ethyl)tetrahydrothebaine, as in Example 40, was obtained as white prisms M.P. 242° C. on recrystallization from methanol. Found: C, 74.2; H, 8.2; $C_{28}H_{37}O_4N$ requires C, 74.5; H, 8.2%.

EXAMPLE 60

6,14-endoetheno-7-(2-hydroxy-2-propyl)-tetrahydrothebaine

Ethyl 6,14-endoetheno-tetrahydrothebaine-7-carboxylate (10 g.) in ether was extracted from a Soxhlet extractor into a boiling stirred solution of methylmagnesium iodide, prepared from magnesium (2.30 g.) methyl iodide (13.6 g.) and ether (80 g.) and the mixture was stirred and heated under reflux for a further three hours. The mixture was then shaken with saturated ammonium chloride solution and the ether layer was separated, dried and evaporated leaving the crystalline base, M.P. 161° C. on recrystallization from aqueous methanol.

EXAMPLE 61

6,14-endoetheno-7-(3-hydroxy-3-pentyl)-tetrahydrothebaine

This was prepared essentially as described in Example 60 from ethyl 6,14 - endotheno - tetrahydrothebaine-7-carboxylate (10 g.), magnesium (2.30 g.) and ethyl bromide (10.5 g.). Removal of the ether left a viscous gum that crystallized in part on trituration with methanol. The crystalline material was collected and recrystallized from methanol when the base was obtained as white prisms M.P. 152° C., bitartrate 130° C.

EXAMPLE 62

6,14-endoetheno-7-(2-hydroxy-2-but-3-enyl)tetrahydrothebaine)

6,14-endoetheno-7-acetyltetrahydrothebaine (10 g.) in anhydrous tetrahydrofuran (10 ml.) was added to an agitated solution of vinyl magnesium bromide maintained at 40–50° C. and prepared from magnesium (1.6 g.) and vinyl bromide (7 g.) in anhydrous tetrahydrofuran (5 ml.). The mixture was stirred and heated at 60° C. for 30 mins., poured into saturated aqueous ammonium chloride solution and the product was isolated by four extractions with ether. Evaporation of the combined ether extracts gave a gum, which crystallized on addition of methanol to give the α-isomer, M.P. 155° C. The hydrochloride was prepared by addition of the base to 1 N hydrochloric acid when the salt precipitated, this had M.P. 228° C. (dec.) the β-isomer was not isolated.

What is claimed is:

1. A compound selected from the group consisting of a compound of the formula:

wherein:

R is hydrogen or methyl;

$R^2$ is hydrogen, alkyl of up to 3 carbon atoms, phenyl or tolyl or when R is methyl, alkenyl of up to 3 carbon atoms;

$R^3$ is cycloalkyl of 5 to 7 carbon atoms, alkyl or alkenyl of up to 8 carbon atoms, alkyl of up to 8 carbon atoms mono-substituted on one of the carbon atoms numbered 1 to 4 (the carbon atom numbered 1 being adjacent to the carbon atom bearing the alcoholic hydroxy group) by cycloalkyl of 5 to 7 carbon atoms, phenyl, tolyl, methoxyphenyl, ethoxy, phenoxy or tetrahydrofuryl or alkenyl of up to 8 carbon atoms mono-substituted on one of the carbon atoms numbered 1 to 4 by phenyl provided that where R is hydrogen, and $R_3$ does not contain the systems attached directly to the carbon atom bearing the alcoholic hydroxy group and pharmaceutically acceptable non-toxic salts thereof.

2. A compound of the formula:

wherein:

$R^2$ is hydrogen, alkyl or alkenyl of up to 3 carbon atoms, or phenyl;

$R^3$ is cycloalkyl of 5 to 7 carbon atoms, alkyl or alkenyl of up to 8 carbon atoms, alkyl of up to 8 carbon atoms number 1 to 4 (the carbon atom mono-substituted on one of the carbon atoms numbered 1 being adjacent to the carbon atom bearing the alcoholic hydroxy group) by cycloalkyl of 5 to 7 carbon atoms, phenyl, methoxyphenyl, ethoxy, phenoxy, tetrahydrofuryl or alkenyl of up to 8 carbon atoms mono-substituted on one of the carbon atoms numbered 1 to 4 by phenyl, and pharmaceutically acceptable non-toxic salts thereof.

3. The compound of claim 1 which is 6,14-endoetheno-7-(2-hydroxy-2-pentyl)-tetrahydrothebaine.

4. The compound of claim 1 which is 6,14-endoetheno-7-(2-hydroxy-2-heptyl)-tetrahydrothebaine.

5. The compound of claim 1 which is 6,14-endoetheno-7-(2-hydroxy-1-phenyl-2-propyl)-tetrahydrothebaine.

6. The compound of claim 1 which is 6,14-endoetheno-7-(3-hydroxy-1-phenyl-3-butyl)-tetrahydrothebaine.

7. A compound of the formula:

wherein:

$R^2$ is hydrogen, alkyl of up to 3 carbon atoms, phenyl or tolyl;

$R^3$ is cycloalkyl of 5 to 7 carbon atoms, alkyl or alkenyl of up to 8 carbon atoms, or alkyl of up to 8 carbon atoms, mono-substituted on one of the carbon atoms numbered 1 to 4 (the carbon atom numbered 1 being adjacent to the carbon atom bearing the alcoholic hydroxy group) by cycloalkyl of 5 to 7 carbon atoms, phenyl or tolyl, or alkenyl of up to 8 carbon atoms mono-substituted on one of the carbon atoms numbered 1 to 4 by phenyl, provided that $R^3$ does not contain the systems attached directly to the carbon atom bearing the alcoholic hydroxy group, and pharmaceutically acceptable non-toxic salts thereof.

8. The compound of claim 7 which is 6,14-endoetheno-7-(1-hydroxy-1-ethyl)-tetrahydro-oripavine.

9. The compound of claim 7 which is 6,14-endoetheno-7-(2-hydroxy-2-pentyl)-tetrahydro-oripavine.

10. The compound of claim 7 which is 6,14-endoetheno-7-(2-hydroxy-2-hexyl)-tetrahydro-oripavine.

11. The compound of claim 7 which is 6,14-endoetheno-7-(2-hydroxy-5-methyl-2-hexyl)-tetrahydro-oripavine.

12. The compound of claim 7 which is 6,14-endoetheno-7-(3-hydroxy-1-phenyl-3-butyl)-tetrahydro-oripavine.

References Cited

UNITED STATES PATENTS 3,285,914  11/1966  Gordon _____________ 260—285

FOREIGN PATENTS 969,263  9/1964  Great Britain.

OTHER REFERENCES

Bentley: Morphine Alkaloids, Oxford, 1954, p. 290.
Braun: Ber. Deut. Chem., vol. 59, pp. 1081–2 (1926).

DONALD G. DAUS, Primary Examiner

U.S. Cl. X.R.

424—260

UNITED STATES PATENT OFFICE
CERTIFICATE OF CORRECTION

Patent No. 3,474,101                              October 21, 1969

Kenneth Walter Bentley

Figure 1:
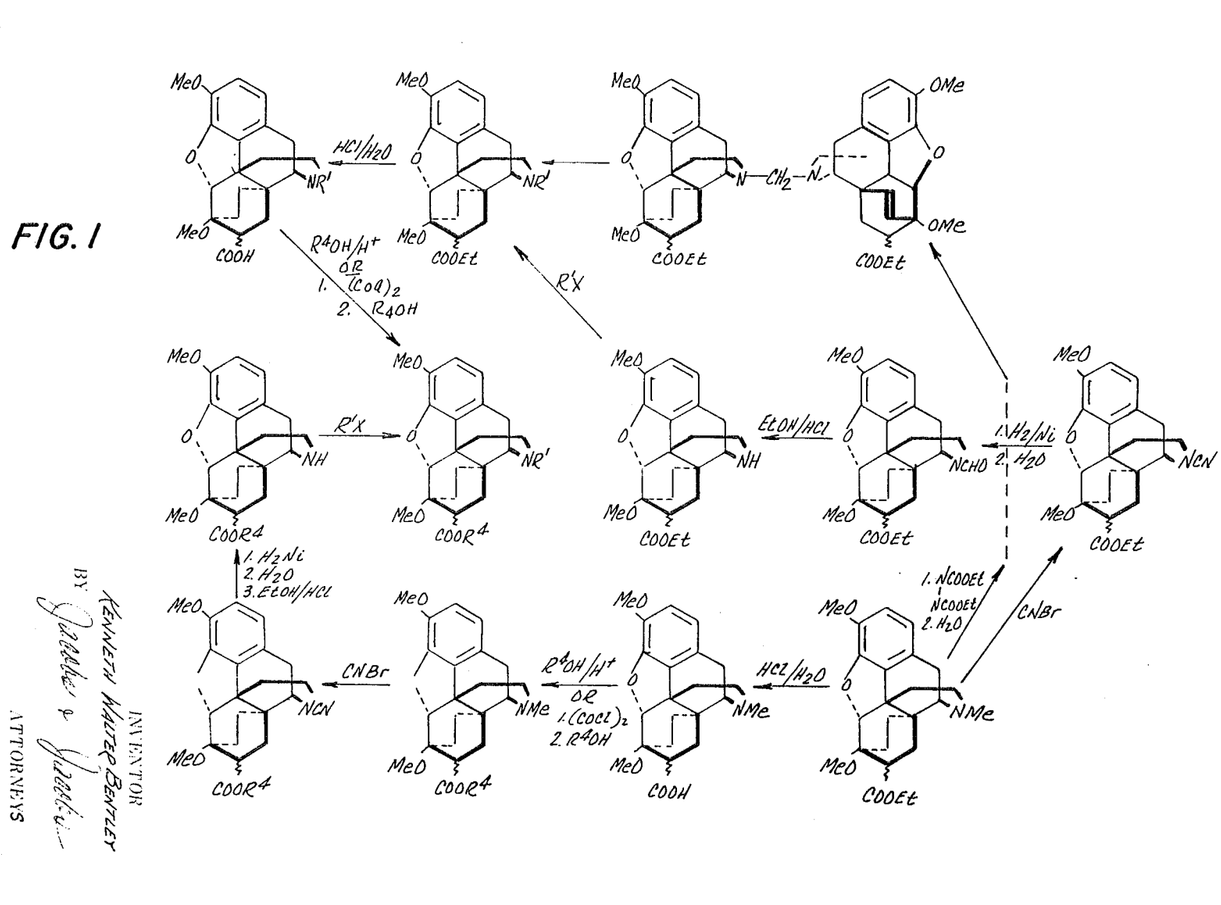
FIGURES 1 to 4 of the drawings form a flow sheet which illustrates the synthetic methods of preparation of the compounds of the present invention and of the compounds disclosed in my continuation-in-part applications, Ser. Nos. 726,591 and 726,592. The sequence of the drawings, reading from left to right, is FIGURE 1, FIGURE 2 and beneath that, FIGURE 3 and FIGURE 4.
Figure 2:
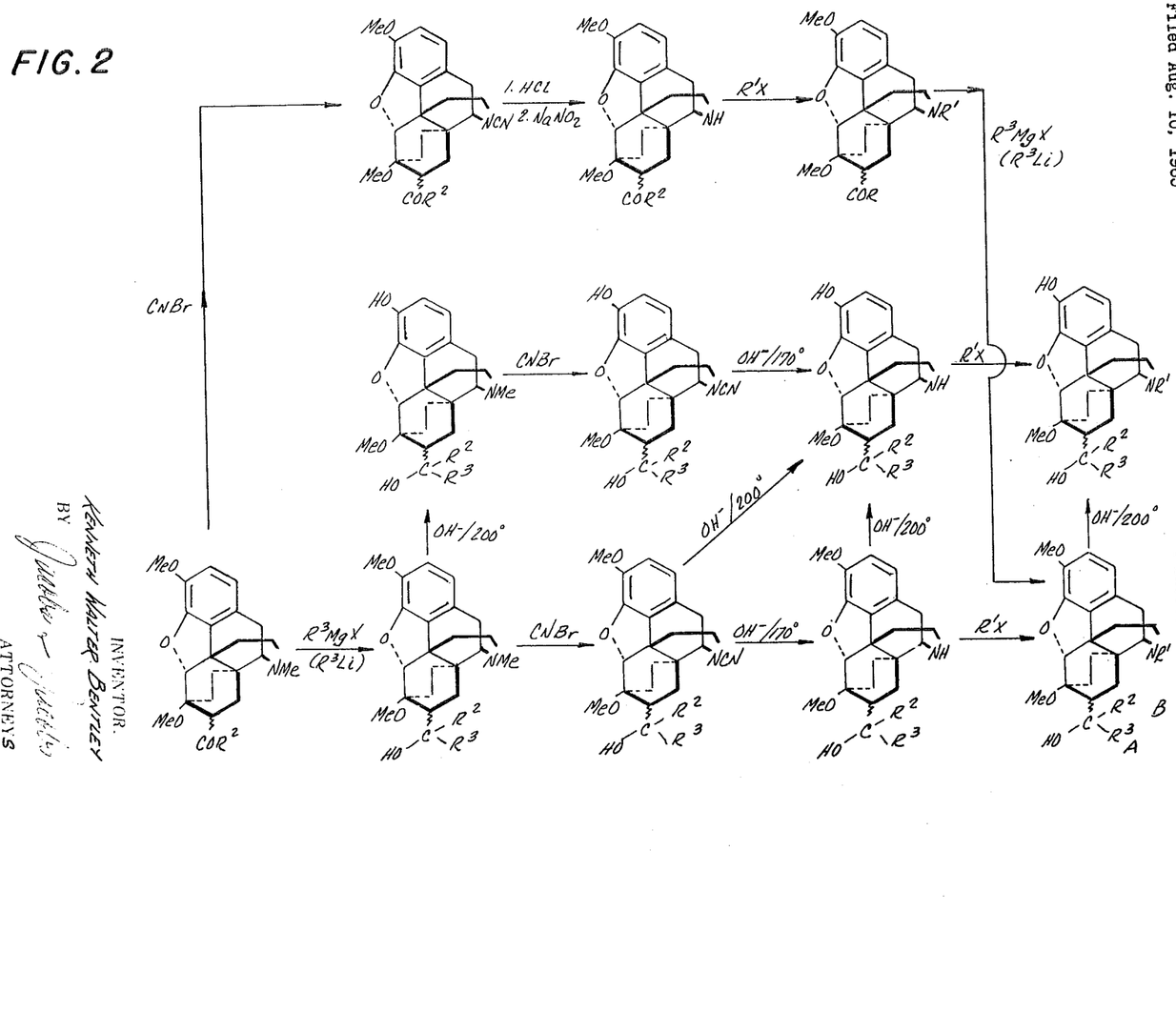
Figure 3:
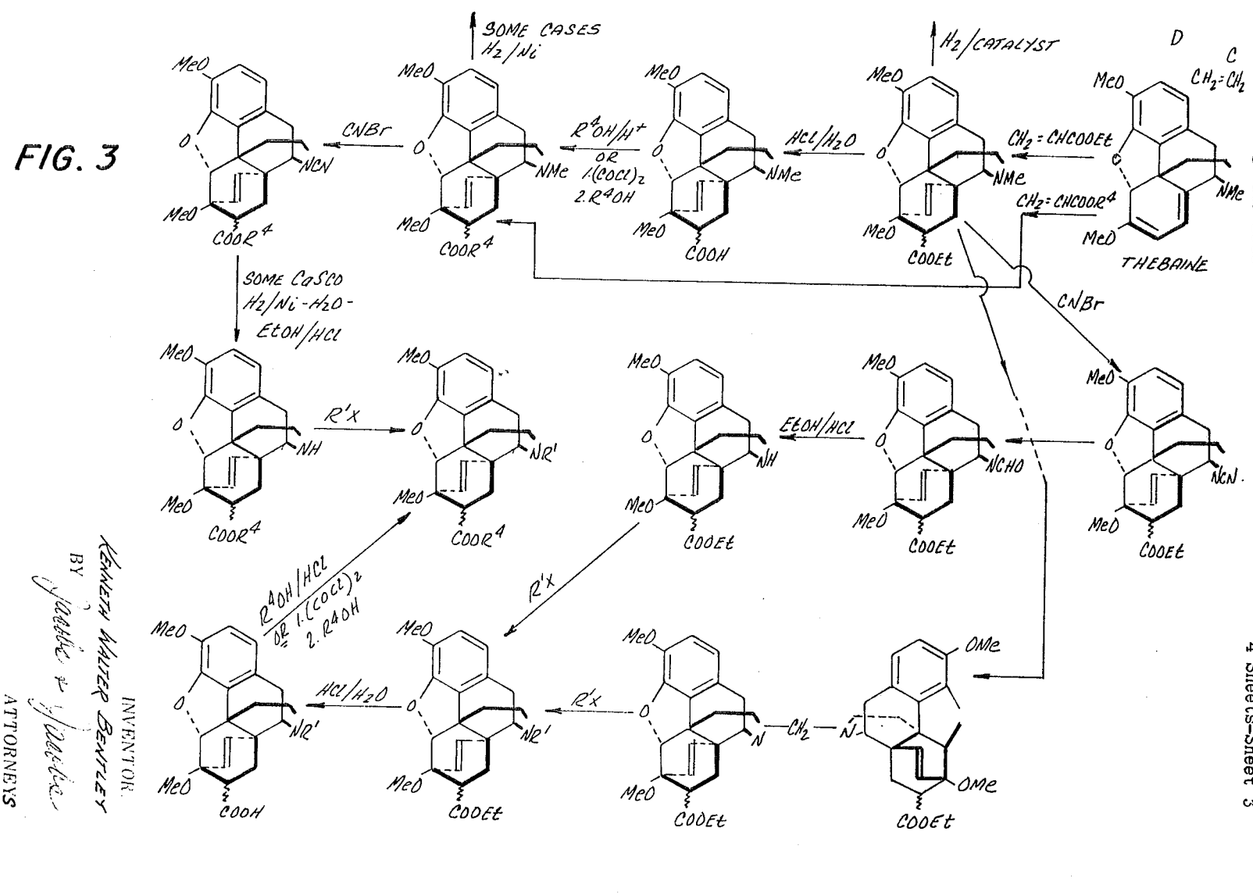
Figure 4:
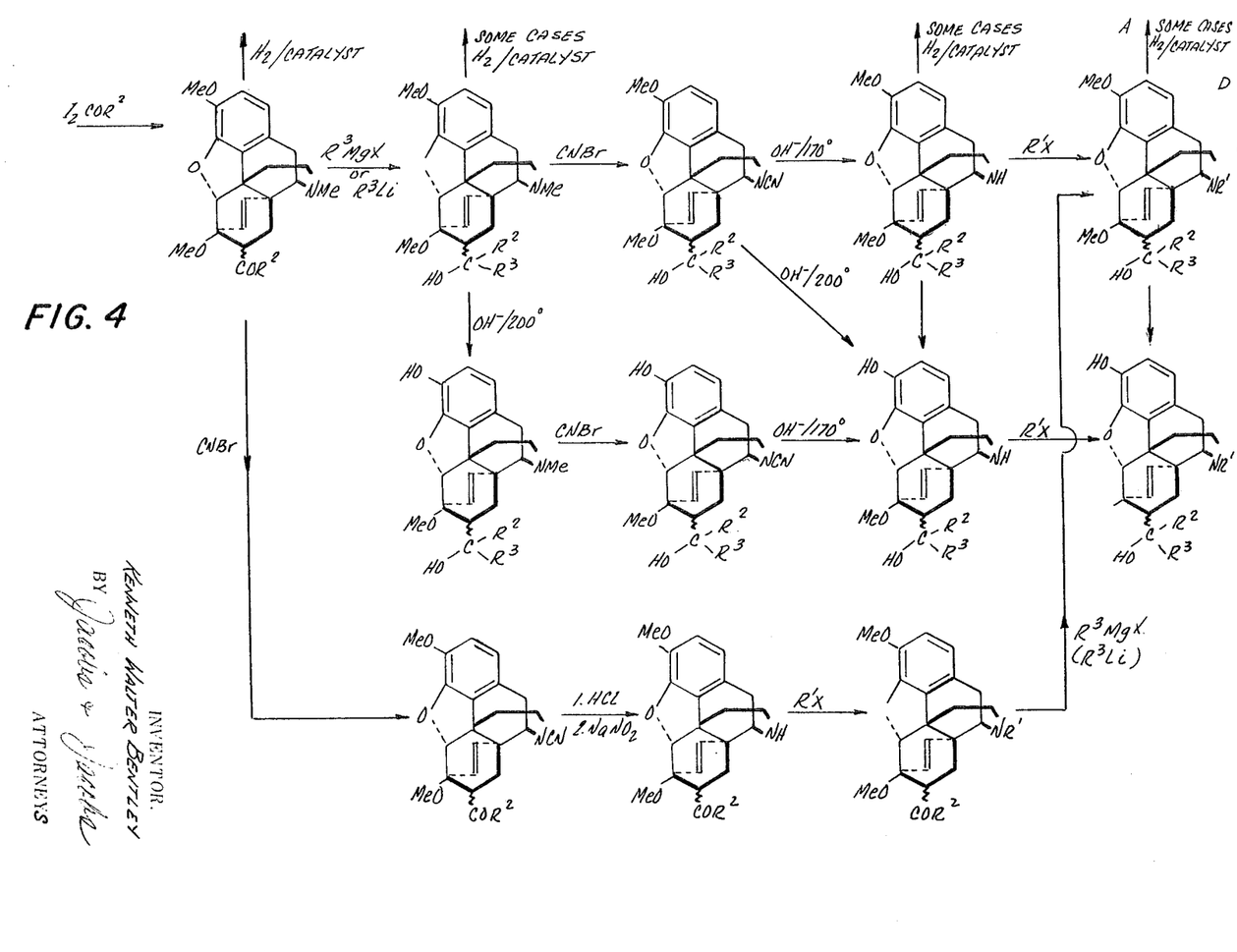

It is certified that error appears in the above identified patent and that said Letters Patent are hereby corrected as shown below:

In the drawings, Fig. 1, topline, in right structure, change double bond to single in "Endo" bridge. Fig. 1, top line, above arrow between right to center structure insert "R'X". Fig. 1, above diagonal down arrows between top and center lines, correct $(COA)_2$ to read "$(COCl)_2$". Fig. 1, ultimate line, insert missing heterocyclic O's. Fig. 2, ultimate line, right formula, change "COR" to "$COR^2$". Fig. 3, left vertical row, between top and center formula, change "CASCO" to "CASES". Fig. 3, fourth vertic. row, arrow between and bottom formulae, insert "1. NCOOET
     ||
     NCOOET        2. $H_2O$"      adjacent thereto. Fig. 3, right figure in bottom lines, insert missing heterocyclic "O". Fig. 3, center line, above arrow from right to adjacent structure, insert "1. $N_2$/Ni" and below, insert "2. $H_2O$". Fig. 4, arrow to first structure, top line, change "$I_2$" to "$CH_2=CH$". Fig. 4, top line, second structure and bottom line, right structure, insert missing heterocyclic "O"s. Fig. 1, above lower right structure, insert an additional bond between "N". Column 1, line 11, "23,033/65"
$$\overset{|}{N}$$
should read -- 23,733/65 --. Column 17, lines 61 and 62 should read -- Carbon atoms mono-substituted on one of the carbon atoms numbered 1 to 4 (the carbon atom numbered --. Column 18, line 36 should read $$-\overset{|}{C}H\text{-phenyl}, \quad -\overset{|}{C}H\text{-tolyl or } -\overset{|}{C}H-\overset{|}{C}=\overset{|}{C}-$$

Signed and sealed this 13th day of October 1970.

(SEAL)
Attest:

EDWARD M. FLETCHER, JR.                        WILLIAM E. SCHUYLER, JR.
                                                                        Commissioner of Patents